US012565322B2

(12) United States Patent
Journade et al.

(10) Patent No.: US 12,565,322 B2
(45) Date of Patent: Mar. 3, 2026

(54) PROPULSION SYSTEM FOR AN AIRCRAFT COMPRISING A TURBOJET, A PYLON AND ENGINE ATTACHMENT

(71) Applicant: Airbus Operations SAS, Toulouse (FR)

(72) Inventors: Frédéric Journade, Toulouse (FR); Olivier Pautis, Toulouse (FR); Jérôme Colmagro, Toulouse (FR); Germain Gueneau, Toulouse (FR); Pierre-Antoine Combes, Toulouse (FR); Marc De Nicola, Toulouse (FR); Fabrice Grimal, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/796,631

(22) Filed: Aug. 7, 2024

(65) Prior Publication Data

US 2025/0051020 A1 Feb. 13, 2025

Related U.S. Application Data

(60) Provisional application No. 63/518,460, filed on Aug. 9, 2023.

(30) Foreign Application Priority Data

Jul. 17, 2024 (EP) ...................................... 24189081

(51) Int. Cl.
B64D 27/40 (2024.01)
(52) U.S. Cl.
CPC ......... B64D 27/406 (2024.01); B64D 27/404 (2024.01)

(58) Field of Classification Search
CPC ... B64D 27/402; B64D 27/404; B64D 27/406
See application file for complete search history.

(56) References Cited

U.S. PATENT DOCUMENTS

| | | | | |
|---|---|---|---|---|
| 5,871,175 A | * | 2/1999 | Demouzon | ............ B64D 27/40 |
| | | | | 60/797 |
| 5,871,177 A | * | 2/1999 | Demouzon | .......... B64D 27/402 |
| | | | | 60/797 |
| 6,347,765 B1 | * | 2/2002 | Jule | ........................ B64D 27/40 |
| | | | | 60/797 |

(Continued)

FOREIGN PATENT DOCUMENTS

| | | | | |
|---|---|---|---|---|
| EP | 3757012 A1 | * | 12/2020 | ............ B64D 27/26 |
| FR | 3098193 A1 | * | 1/2021 | ............ B64D 27/18 |

*Primary Examiner* — Joseph W Sanderson
(74) *Attorney, Agent, or Firm* — Greer, Burns & Crain, Ltd.

(57) ABSTRACT

A propulsion system comprising a turbojet with a fan casing and a central casing, a pylon with an upper spar, a front wall and on either side of a vertical median plane, a fitting rigidly fixed to the rigid structure, a cylindrical pin as one with the fan casing and inserted in a hole of the upper spar, a shackle with at the vertical median plane, an upper articulation between the shackle and the front wall and on either side of the vertical median plane, a lower articulation between the shackle and the central casing, and two reaction rods disposed on either side of the median plane, where each rod is articulated, at a front end, on the central casing, and, at rear end, on the fitting.

6 Claims, 3 Drawing Sheets

(56) References Cited

U.S. PATENT DOCUMENTS

| | | | | | |
|---|---|---|---|---|---|
| 6,474,596 B1 * | 11/2002 | Cousin | | B64D 27/40 | |
| | | | | 244/54 | |
| 6,474,597 B1 * | 11/2002 | Cazenave | | B64D 27/18 | |
| | | | | 244/54 | |
| 7,232,091 B2 * | 6/2007 | Marche | | B64D 27/404 | |
| | | | | 244/54 | |
| 7,624,945 B2 * | 12/2009 | Diochon | | B64D 27/40 | |
| | | | | 60/797 | |
| 7,770,840 B2 * | 8/2010 | Diochon | | B64D 27/404 | |
| | | | | 244/54 | |
| 8,800,916 B2 * | 8/2014 | Marche | | B64D 27/40 | |
| | | | | 244/54 | |
| 9,637,241 B2 * | 5/2017 | Schnelz | | B64D 27/40 | |
| 10,144,524 B2 * | 12/2018 | Binks | | B64D 27/40 | |
| 11,077,954 B2 * | 8/2021 | Schelfaut | | B64D 27/14 | |
| 11,407,520 B2 * | 8/2022 | Vayssieres | | B64D 27/404 | |
| 11,702,216 B2 * | 7/2023 | Berjot | | B64D 27/406 | |
| | | | | 244/54 | |
| 11,970,280 B2 * | 4/2024 | Glemarec | | B64D 27/40 | |
| 12,258,137 B2 * | 3/2025 | Beutin | | B64D 27/18 | |

| | | | | |
|---|---|---|---|---|
| 2005/0194493 A1 * | 9/2005 | Marche | B64D 27/40 | |
| | | | 244/54 | |
| 2007/0205323 A1 * | 9/2007 | Lionel | B64D 27/40 | |
| | | | 244/53 R | |
| 2007/0228213 A1 * | 10/2007 | Diochon | B64D 27/40 | |
| | | | 244/54 | |
| 2012/0286125 A1 * | 11/2012 | Marche | B64D 27/406 | |
| | | | 248/554 | |
| 2013/0240666 A1 * | 9/2013 | Schnelz | B64D 27/40 | |
| | | | 244/54 | |
| 2014/0084129 A1 * | 3/2014 | Sandy | B64D 27/40 | |
| | | | 248/554 | |
| 2014/0369810 A1 * | 12/2014 | Binks | B64D 27/40 | |
| | | | 244/54 | |
| 2019/0185170 A1 * | 6/2019 | Schelfaut | B64D 27/40 | |
| 2020/0361618 A1 * | 11/2020 | Vayssieres | F02C 7/20 | |
| 2021/0114741 A1 * | 4/2021 | Berjot | B64D 27/40 | |
| 2021/0284348 A1 * | 9/2021 | Whiteford | B64D 27/402 | |
| 2023/0028982 A1 * | 1/2023 | Glemarec | B64D 27/40 | |
| 2023/0286662 A1 * | 9/2023 | Ridray | B64D 27/402 | |
| 2024/0239502 A1 * | 7/2024 | Glemarec | B64D 27/402 | |
| 2024/0270396 A1 * | 8/2024 | Beutin | B64D 27/402 | |

* cited by examiner

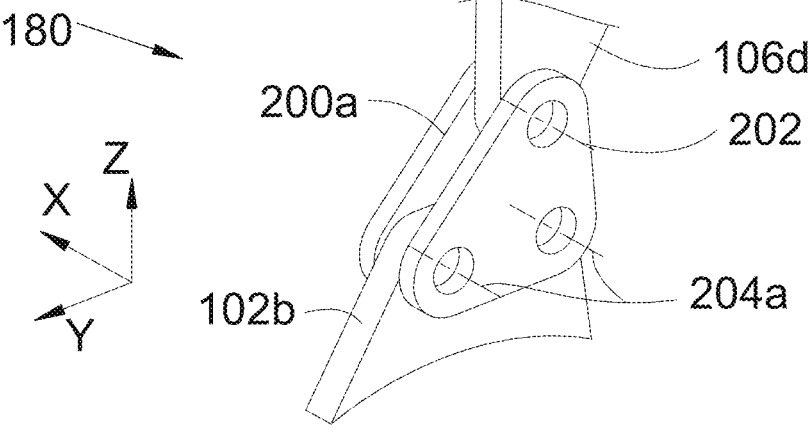
<u>Fig. 4</u>
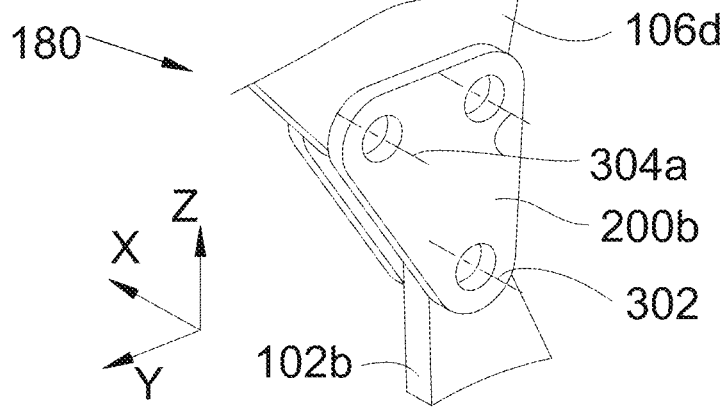
<u>Fig. 5</u>

PROPULSION SYSTEM FOR AN AIRCRAFT COMPRISING A TURBOJET, A PYLON AND ENGINE ATTACHMENT

CROSS-REFERENCES TO RELATED APPLICATIONS

This application claims the benefit of European Patent Application Number 24189081.3 filed on Jul. 17, 2024, and claims priority to U.S. Provisional Patent Application Ser. No. 63/518,460, filed on Aug. 9, 2023, the entire disclosures of which are incorporated herein by way of reference.

FIELD OF THE INVENTION

The present invention relates to the general field of attachment of a turbojet under the wing of an aircraft. It concerns in particular a propulsion system comprising a turbojet, in particular a double-flow engine, a pylon and an engine attachment for fixing the turbojet under the pylon. It also applies to an aircraft equipped with such a propulsion system.

BACKGROUND OF THE INVENTION

A state-of-the-art propulsion system is attached under a wing of an aircraft. It has a turbojet and a pylon through which the turbojet is attached under the wing. The pylon has a rigid structure, also known as primary structure, with attachment elements for attaching the turbojet.

These attachment elements consist of a front engine attachment, a rear engine attachment, and a device to resume the thrust forces generated by the turbojet.

The pylon also has other attachment elements allowing the attachment of the pylon to the wing.

Although such a structure is satisfactory, it is desirable to find an alternative arrangement that allows, among other things, a reduced weight and a better transfer of loads to the pylon.

SUMMARY OF THE INVENTION

An object of the present invention is to propose a propulsion system comprising a turbojet, a pylon and elements for attaching the turbojet under the pylon with better load transfer.

To this end, is proposed a propulsion system of an aircraft, said propulsion system comprising:

a turbojet extending around a longitudinal axis and having a vertical median plane passing through the longitudinal axis and having a fan casing and a central casing at the rear of the fan casing, a pylon presenting a rigid structure with an upper spar, a front wall and on either side of the vertical median plane, a fitting rigidly fixed to the rigid structure, a cylindrical pin as one with the fan casing and the axis of which is vertical, wherein the cylindrical pin is inserted in a hole of the upper spar, a shackle with at the vertical median plane, an upper articulation between the shackle and the front wall and on either side of the vertical median plane, a lower articulation between the shackle and the central casing, two reaction rods disposed on either side of the median plane, where each rod is articulated, at a front end, on the central casing, and, at rear end, on the fitting.

it is also proposed a propulsion system of an aircraft, said propulsion system comprising:

a turbojet extending around a longitudinal axis and having a vertical median plane passing through the longitudinal axis and having a fan casing and a central casing at the rear of the fan casing, and a pylon presenting a rigid structure with an upper spar, a front wall and on either side of the vertical median plane, a fitting rigidly fixed to the rigid structure, a cylindrical pin as one with the fan casing and the axis of which is vertical, wherein the cylindrical pin is inserted in a hole of the upper spar, a shackle with at the vertical median plane, a lower articulation between the shackle and the central casing and, on either side of the vertical median plane, an upper articulation between the shackle and the front wall, and two reaction rods disposed on either side of the median plane, where each rod is articulated, at a front end, on the central casing, and, at a rear end, on the fitting.

With such an arrangement, it is not necessary to have a rear attachment between the turbojet and the pylon and the assembly is lighter.

Advantageously, the articulation of the front end of each rod, the articulation of the cylindrical pin and each upper articulation of the shackle are located at a same single plane oriented from the front to the rear and from the top to the bottom.

The invention proposes also an aircraft comprising a wing and a propulsion system according to one of the preceding embodiments, of which the rigid structure is fastened beneath the wing.

BRIEF DESCRIPTION OF THE DRAWINGS

The characteristics of the invention will emerge more clearly from a reading of the following description of at least one embodiment, said description being produced with reference to the accompanying drawings, among which:

FIG. 4 is a perspective view of a first embodiment of a specific shackle attachment, and FIG. 5 is a perspective view of a second embodiment of the specific shackle attachment.

DETAILED DESCRIPTION OF THE PREFERRED EMBODIMENT

Figure 1:
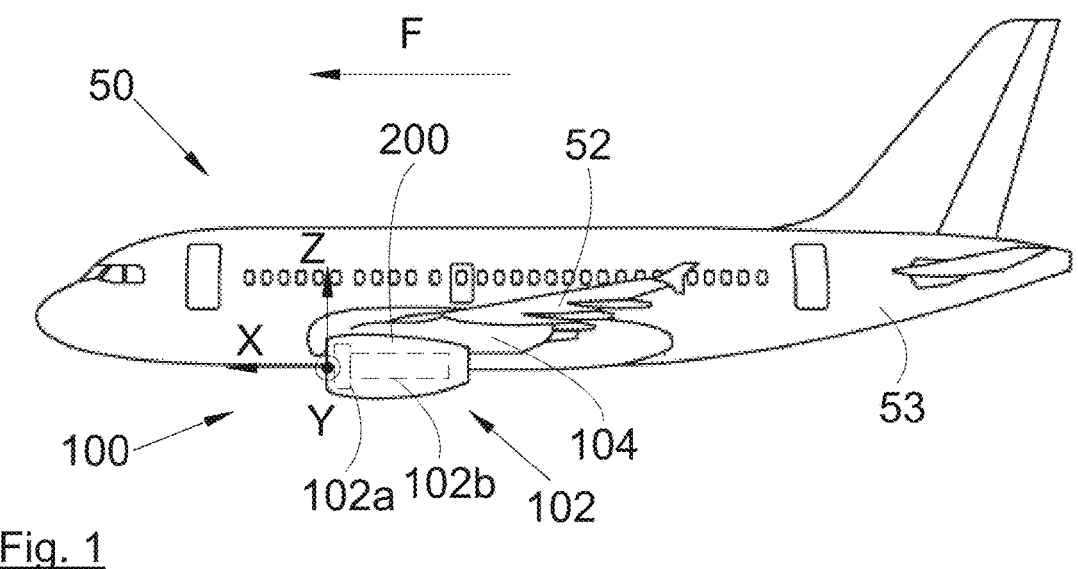
FIG. 1 represents a side view of an aircraft according to the invention.

FIG. 1 shows an aircraft 50 which has a wing 52 under which is mounted a propulsion system 100 according to the invention and which comprises a pylon 104 and a turbojet 102 housed here in a nacelle 200. In the embodiment of the invention shown in FIG. 1, the aircraft 50 has a fuselage 53 on each side of which a wing 52 is fixed.

By convention, X is the longitudinal axis of the turbojet 102, this axis X being parallel to a longitudinal direction of this turbojet 102. On the other hand, Y is the transverse axis of the turbojet 102 which is horizontal when the aircraft is on the ground, and Z is the vertical axis or vertical height when the aircraft is on the ground, these three axes X, Y and Z being orthogonal between them.

On the other hand, the terms "front" and "rear" are to be considered in relation to a direction of advance of the aircraft 50 during the operation of the turbojet 102, this direction being schematically represented by the arrow F.

The pylon 104 and the turbojet 102 are generally symmetrical with respect to a vertical median plane XZ of the turbojet 102 which passes through the longitudinal axis X of the turbojet 102 and which is subsequently called median plane P and the transverse axis Y is perpendicular to the median plane P.

The vertical axis Z is inscribed in the median plane P and perpendicular to the longitudinal axis X.

Figure 2:
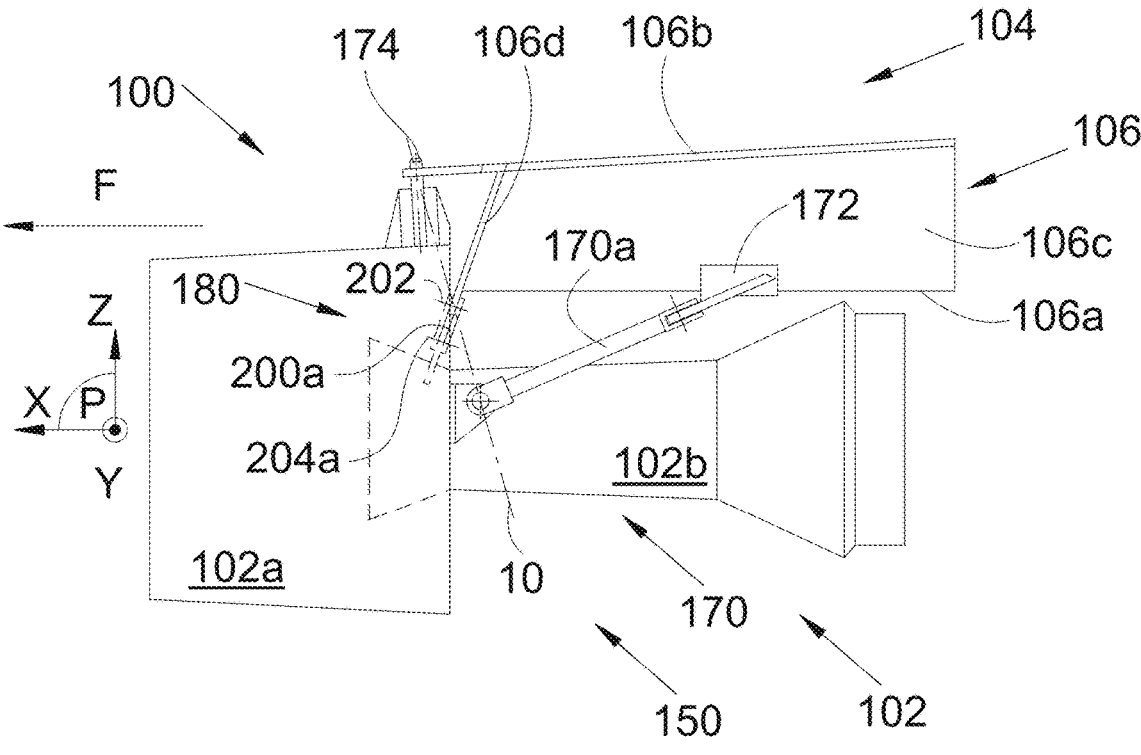
FIG. 2 is a side view of a propulsion system according to the invention.

FIG. 2 shows an embodiment of the propulsion system 100.

The propulsion system 100 comprises the turbojet 102 and the pylon 104 by which the turbojet 102 is attached to the wing 52 (not shown in FIG. 2). The pylon 104 is represented here by its rigid structure 106, also called primary structure, carrying an engine attachment 150 which ensures the attachment of the turbojet 102 under the rigid structure 106.

The jet engine 102 has at the front, a fan casing 102a surrounding an annular fan duct in which a fan rotates and at the rear of the fan casing 102a, a central casing 102b of smaller size, enclosing the core of the jet engine 102 as compression stages, a combustion chamber, turbine stages and an ejection nozzle. The fan casing 102a and the central casing 102b are around the longitudinal axis X. In the embodiment represented in FIG. 1, the central casing 102b extends, for a part (in dash lines), in the rear part of the fan casing 102a.

The rigid structure 106 extends along the longitudinal axis X between a front end and a rear end and takes the form of a box that has a lower spar 106a, an upper spar 106b, two lateral walls 106c and a frontal wall 106d which are fixed together to realize the rigid structure 106. The lower end of the front wall 106d is oriented towards the front of the aircraft 50. A lateral wall 106c is arranged on each side of the vertical median plane P. The upper spar 106b is above the lateral walls 106c and the lower spar 106a is beneath the lateral walls 106c.

The upper spar 106b extends forwardly in respect to the front wall 106d, it means that the upper spar 106b has a front end that is far from the front wall 106d in the forward direction F.

The rigid structure 106 is fixed beneath the wing 52 by a fastening system that is not represented, because it is outside the perimeter of the invention and can take any form known to the skilled person.

The engine attachment 150 comprises a reaction device 170 for reacting the thrust forces generated by the jet engine 102. Here the reaction device 170 comprises two reaction rods 170a disposed on either side of the median plane P and each rod 170a is articulated, on the one hand, at a front end, on the central casing 102b, and, on the other hand, at a rear end, on a fitting 172 rigidly fixed to the rigid structure 106, especially at the lateral and lower corner of the rigid structure 106, for example at the lower spar 106a and at the lateral wall 106c. The articulations of the rods 170a on the central casing 102b are located at 3 and 9 o'clock.

Each end of each rod 170a is attached respectively to the central casing 102b and to the fitting 172 through a clevis. For this purpose, each end of each rod 170a is a female clevis and a male clevis is formed by a part of the central casing 102b and of the fitting 172. A reverse mounting is also possible. Each clevis forms a rotation. Here, the axis of the clevis at the front is perpendicular to the median plane P and the axis of the clevis at the rear is oriented from the front to the rear and from the top to the bottom, here around 20° with the vertical direction.

The engine attachment 150 comprises also at the vertical median plane P, a cylindrical pin (spigot) 174, the axis of which is vertical, i.e., parallel to the vertical axis Z. The cylindrical pin 174 is as one with the fan casing 102a and is inserted in a hole through the rigid structure 106 and especially through the upper spar 106b. There are no possible movements between the cylindrical pin 174 and the rigid structure 106 according to the longitudinal X and the transverse Y axis and there are possible movements between the cylindrical pin 174 and the rigid structure 106 according to according to the vertical axis Z and around the vertical axis Z, i.e., the diameter of the cylindrical pin 174 and the diameter of the hole are adjusted.

Figure 3:
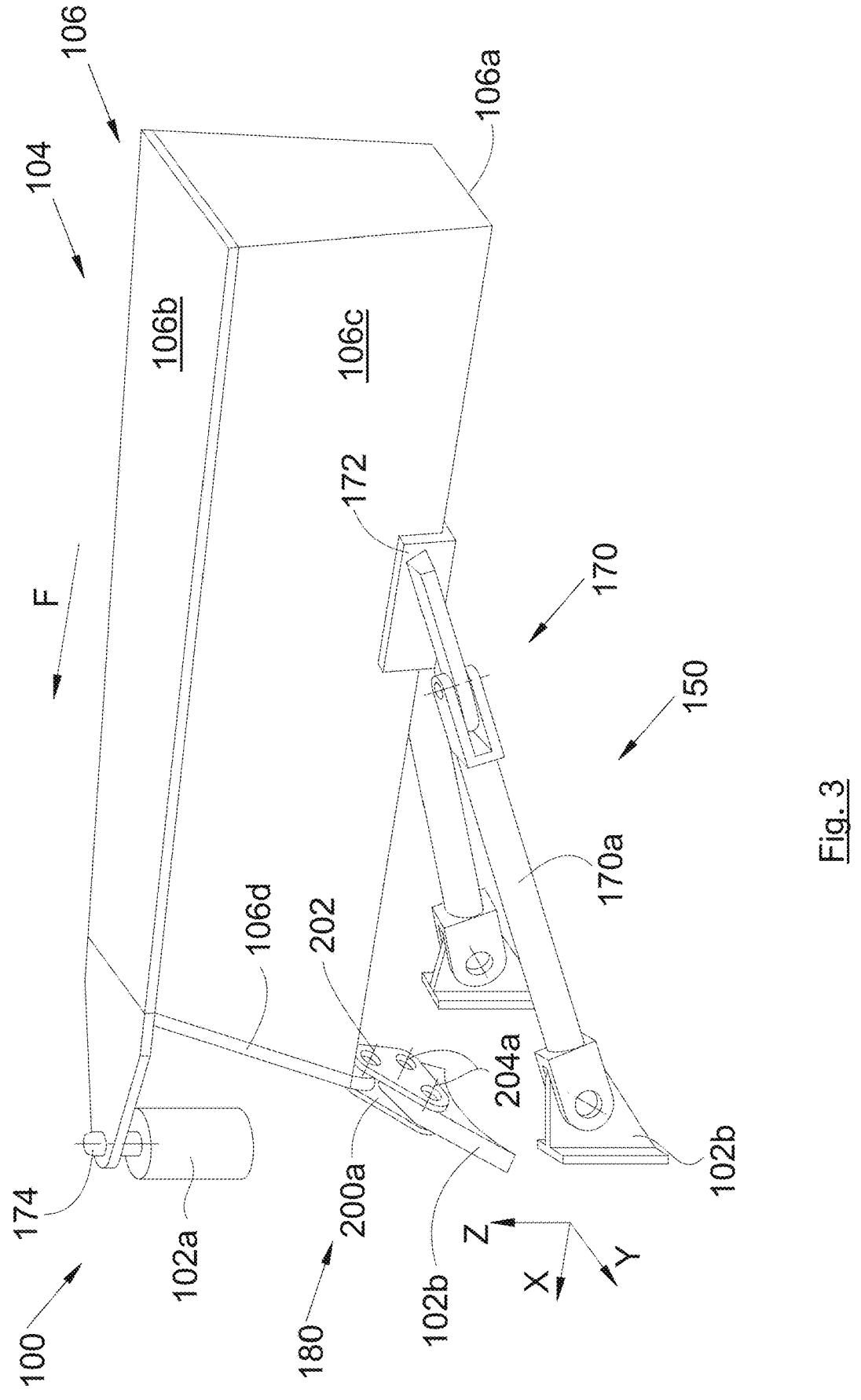
FIG. 3 is a perspective view of the propulsion system according to the invention.

The engine attachment 150 comprises also a shackle assembly 180 between the central casing 102b and a lower end of the front wall 106d with a first embodiment represented in FIGS. 3 and 4 and a second embodiment represented in FIG. 5.

The shackle assembly 180 comprises a shackle 200a-b with three articulation points. For safety reasons, the shackle 200a-b is a double shackle.

In the first embodiment, there is, at the vertical median plane P, an upper articulation 202 between the shackle 200a and the front wall 106d and there are, on either side of the vertical median plane P, a lower articulation 204a-b between the shackle 200a and the central casing 102b.

In the second embodiment, there is, at the vertical median plane P, a lower articulation 302 between the shackle 200b and the central casing 102b and there is, on either side of the vertical median plane P, an upper articulation 304a-b between the shackle 200b and the front wall 106d.

Each articulation of the shackle assembly 180 is realized thanks to an axis (not shown) crossing the shackle 200a-b and the associated element, i.e., the central casing 102b or the front wall 106d. Each articulation takes the form of a rotation around an axis which is also oriented from the front to the rear and from the top to the bottom.

Thanks to this engine attachment 150, the assembly is isostatic and reacts according to six degrees of freedom. Two degrees of freedom (according to the longitudinal axis X and the transverse axis Y) are managed through the cylindrical pin 174. Two degrees of freedom (according to the transverse axis Y and the vertical axis Z) are managed through the shackle assembly 180. Two degrees of freedom (according to the longitudinal axis X and the vertical axis Z) are managed through the rods 170a of the reaction device 170.

At the same time, with the engine attachment 150, the moment Mx is reacted through upper and lower Y loads and one Z blocker point, the moment My is reacted through upper and lower X loads and one Z blocker point, and moment Mz is reacted through two thrust rods and one Y blocker point. All moments (Mx/My/Mz) are reacted on both fan casing 102a and central casing 102b, removing any engine core case bending. Such a configuration provides advantages for engine core closures (tip clearances), management, and improvement of specific fuel consumption.

Thanks to the previous arrangement, the propulsion assembly 100 does not comprise a rear attachment between the rigid structure 106 and a rear upper part of the central casing 102b. with this arrangement, the weight of the propulsion assembly 100 is reduced.

In the present embodiment, the articulation of the front end of each rod 170a, the articulation of the cylindrical pin 174 and each upper articulation of the shackle assembly 180 are located around a same single plane 10, which is also oriented from the front to the rear and from the top to the bottom and is here globally parallel to the axis of the clevis at the rear end of the rods 170a. Said single plane 10 is globally aligned with an aft plane of the fan casing 102a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system of an aircraft, the propulsion system comprising:
   a turbojet extending around a longitudinal axis and having a vertical median plane passing through the longitudinal axis and further having a fan casing and a central casing at a rear of the fan casing,
   a pylon comprising a rigid structure with an upper spar, a front wall, and, on each side of the vertical median plane, a fitting rigidly fixed to the rigid structure,
   a cylindrical pin on the fan casing, the cylindrical pin having an axis which is vertical, wherein the cylindrical pin is inserted in a hole of the upper spar,
   a shackle with, at the vertical median plane, an upper articulation between the shackle and the front wall and, on each side of the vertical median plane, a lower articulation between the shackle and the central casing, and
   two reaction rods disposed on either side of the median plane, where each reaction rod comprises a front articu-lation, at a front end, on the central casing, and, a rear articulation, at a rear end, on one of the fittings of the pylon.

2. The propulsion system according to claim 1, wherein the front articulation of the front end of each rod, an articulation of the cylindrical pin, and each upper articulation of the shackle are located at a same single plane oriented from a front to a rear and from a top to a bottom.

3. An aircraft comprising:
   a wing, and
   the propulsion system according to claim 1, wherein the rigid structure is fastened beneath the wing.

4. A propulsion system of an aircraft, the propulsion system comprising:
   a turbojet extending around a longitudinal axis and having a vertical median plane passing through the longitudinal axis and further having a fan casing and a central casing at a rear of the fan casing, and
   a pylon comprising a rigid structure with an upper spar, a front wall, and, on each side of the vertical median plane, a fitting rigidly fixed to the rigid structure,
   a cylindrical pin on the fan casing, the cylindrical pin having an axis which is vertical, wherein the cylindrical pin is inserted in a hole of the upper spar,
   a shackle with, at the vertical median plane, a lower articulation between the shackle and the central casing and, on each side of the vertical median plane, an upper articulation between the shackle and the front wall, and
   two reaction rods disposed on either side of the median plane, where each reaction rod comprises a front articu-lation, at a front end, on the central casing, and, a rear articulation, at a rear end, on one of the fittings of the pylon.

5. The propulsion system according to claim 4, wherein the articulation of the front end of each rod, an articulation of the cylindrical pin, and each upper articulation of the shackle are located at a same single plane oriented from a front to a rear and from a top to a bottom.

6. An aircraft comprising:
   a wing, and
   the propulsion system according to claim 4, wherein the rigid structure is fastened beneath the wing.

\* \* \* \* \*